(12) United States Patent
Tinklenberg et al.

(10) Patent No.: US 12,245,008 B2
(45) Date of Patent: Mar. 4, 2025

(54) DYNAMIC AUDIO OPTIMIZATION

(71) Applicants: SONY INTERACTIVE ENTERTAINMENT LLC, San Mateo, CA (US); SONY INTERACTIVE ENTERTAINMENT INC., Tokyo (JP)

(72) Inventors: Bethany Tinklenberg, San Mateo, CA (US); Victoria Dorn, San Mateo, CA (US); Mahdi Azmandian, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 367 days.

(21) Appl. No.: 17/828,668

(22) Filed: May 31, 2022

(65) Prior Publication Data

US 2023/0388705 A1 Nov. 30, 2023

(51) Int. Cl.
*G06F 3/16* (2006.01)
*H04R 1/08* (2006.01)
(Continued)

(52) U.S. Cl.
CPC ............... *H04R 3/04* (2013.01); *G06F 3/165* (2013.01); *H04R 1/08* (2013.01); *H04R 29/001* (2013.01)

(58) Field of Classification Search
CPC .......... H04R 3/04; H04R 1/08; H04R 29/001; G06F 3/165
See application file for complete search history.

(56) References Cited

U.S. PATENT DOCUMENTS

| 2007/0033042 A1 | 2/2007 | Marcheret et al. |
| 2008/0111887 A1 | 5/2008 | Cooper et al. |

(Continued)

FOREIGN PATENT DOCUMENTS

| WO | WO 2023/235084 | 12/2023 |
| WO | WO 2023/235088 | 12/2023 |

OTHER PUBLICATIONS

Application No. PCT/US2023/020519, International Search Report and Written Opinion dated Aug. 1, 2023.
(Continued)

*Primary Examiner* — Joseph Saunders, Jr.
(74) *Attorney, Agent, or Firm* — Kilpatrick Townsend & Stockton LLP

(57) ABSTRACT

Systems and methods for dynamic audio optimization associated with digital content are provided. One or more audio profiles including one or more audio settings for one or more audio output devices available to a user may be stored in memory. An incoming audio stream associated with a current interactive session of the user and real-world audio within an identified real-world space where the user is located may be monitored. One or more audio deviations may be detected based on a comparison of the incoming audio stream and the real-world audio within the identified real-world space. An audio profile associated with the current interactive session may be automatically recalibrated to modify at least one of the audio settings. The audio output device may then process audio of the incoming audio stream in accordance with the at least one modified audio setting.

21 Claims, 5 Drawing Sheets

(51) Int. Cl.
  *H04R 3/04* (2006.01)
  *H04R 29/00* (2006.01)

(56) References Cited

U.S. PATENT DOCUMENTS

| | | |
|---|---|---|
| 2009/0094630 A1 | 4/2009 | Brown |
| 2011/0066434 A1 | 3/2011 | Li et al. |
| 2011/0300806 A1 | 12/2011 | Lindahl et al. |
| 2014/0314261 A1* | 10/2014 | Selig ............... H04R 25/70 |
| | | 381/314 |
| 2017/0223471 A1 | 8/2017 | Foo et al. |
| 2018/0242098 A1 | 8/2018 | Pratt et al. |
| 2019/0259360 A1 | 8/2019 | Yoelin |
| 2020/0077190 A1 | 3/2020 | Solis et al. |
| 2020/0382883 A1 | 12/2020 | Woodruff et al. |
| 2020/0382892 A1 | 12/2020 | Mehta et al. |
| 2021/0092534 A1* | 3/2021 | Fichtl ............... H04R 25/505 |
| 2023/0410824 A1 | 12/2023 | Zhang et al. |

OTHER PUBLICATIONS

Application No. PCT/US2023/020720, International Search Report and Written Opinion dated Aug. 1, 2023.
U.S. Appl. No. 17/828,116, Ex Parte Office Action dated Jun. 27, 2024.

* cited by examiner

DYNAMIC AUDIO OPTIMIZATION

BACKGROUND OF THE INVENTION

1. Field of the Invention

The present invention generally relates to dynamic audio optimization. More specifically, the present invention relates to dynamic audio optimization in relation to virtual environments associated with digital content.

2. Description of the Related Art

Presently available digital content may include audio-visual and other types of data presented in association with a virtual environment. Playing the audio associated with such digital content (e.g., interactive game titles and other content titles associated with virtual environments) may therefore involve using one or more audio output devices, including home theater devices, televisions, consoles, controllers, handheld devices, computing devices (including desktops, laptops, tablets, and other mobile devices), other types of speakers and sub-woofers, headsets (including headphones, earphones, or other head- or ear-mounted speakers), and other peripheral or accessory devices that may include associated audio output components. Moreover, each type of audio output device may have different capabilities and settings available, and the sound each audio output device generates may be different when played in rooms or spaces having different acoustic characteristics.

For example, playing an interactive game title may involve presenting a variety of different audio-visual effects associated with a virtual environment, but the player may be using a specific combination of audio devices within a designated play-room. The audio-visual effects may include soundtracks, scores, background noise associated with the virtual (e.g., in-game) environment, sounds associated with virtual characters and objects, etc. During a gameplay session of the interactive game title, multiple different types of audio may be presented simultaneously. For example, an in-game scene may be associated with a musical score, environmental sounds associated with the specific location in the virtual environment, and one or more virtual characters and objects speaking or otherwise making noises or other audio effects. Different users may own different combinations of audio output devices (each having their own respective audio capabilities and settings and creating different types of sounds within differently shapes and configured rooms or spaces), however. As a result of such different, each user may have a different audio experience of the same digital content due to such differences.

In addition, different intermittent or recurring constraints may further cause or require compliance to certain audio parameters. For example, shared households (or multifamily housing) having inter alia small children, elderly parents, or disgruntled neighbors within hearing distance may enforce noise restrictions at certain hours of the day or night. Moreover, audio associated with digital content (e.g., played during an immersive virtual reality session) may also drown out the user's ability to hear what is happening in the real-world environment. Further, other users—particularly those with hearing-related conditions—may have different preferences for audio settings that users without such conditions. Thus, audio parameters may need to be adjusted based on numerous different factors, including the different digital content titles being played, different audio output devices available, different play spaces being used, different user abilities and sensitivities, different existing conditions, etc., in order to optimize an audio experience for the user.

There is, therefore, a need in the art for improved systems and methods of dynamic audio optimization associated with digital content.

SUMMARY OF THE CLAIMED INVENTION

Embodiments of the present invention include systems and methods for dynamic audio optimization associated with digital content. One or more audio profiles including one or more audio settings for one or more audio output devices available to a user may be stored in memory. An incoming audio stream associated with a current interactive session of the user and real-world audio within an identified real-world space where the user is located may be monitored. One or more audio deviations may be detected based on a comparison of the incoming audio stream and the real-world audio within the identified real-world space. An audio profile associated with the current interactive session may be automatically recalibrated to modify at least one of the audio settings. The audio output device may then process audio of the incoming audio stream in accordance with the at least one modified audio setting.

DETAILED DESCRIPTION

Embodiments of the present invention include systems and methods for dynamic audio optimization associated with digital content. One or more audio profiles including one or more audio settings for one or more audio output devices available to a user may be stored in memory. An incoming audio stream associated with a current interactive session of the user and real-world audio within an identified real-world space where the user is located may be monitored. One or more audio deviations may be detected based on a comparison of the incoming audio stream and the real-world audio within the identified real-world space. An audio profile associated with the current interactive session may be automatically recalibrated to modify at least one of the audio settings. The audio output device may then process audio of the incoming audio stream in accordance with the at least one modified audio setting.

Figure 1:
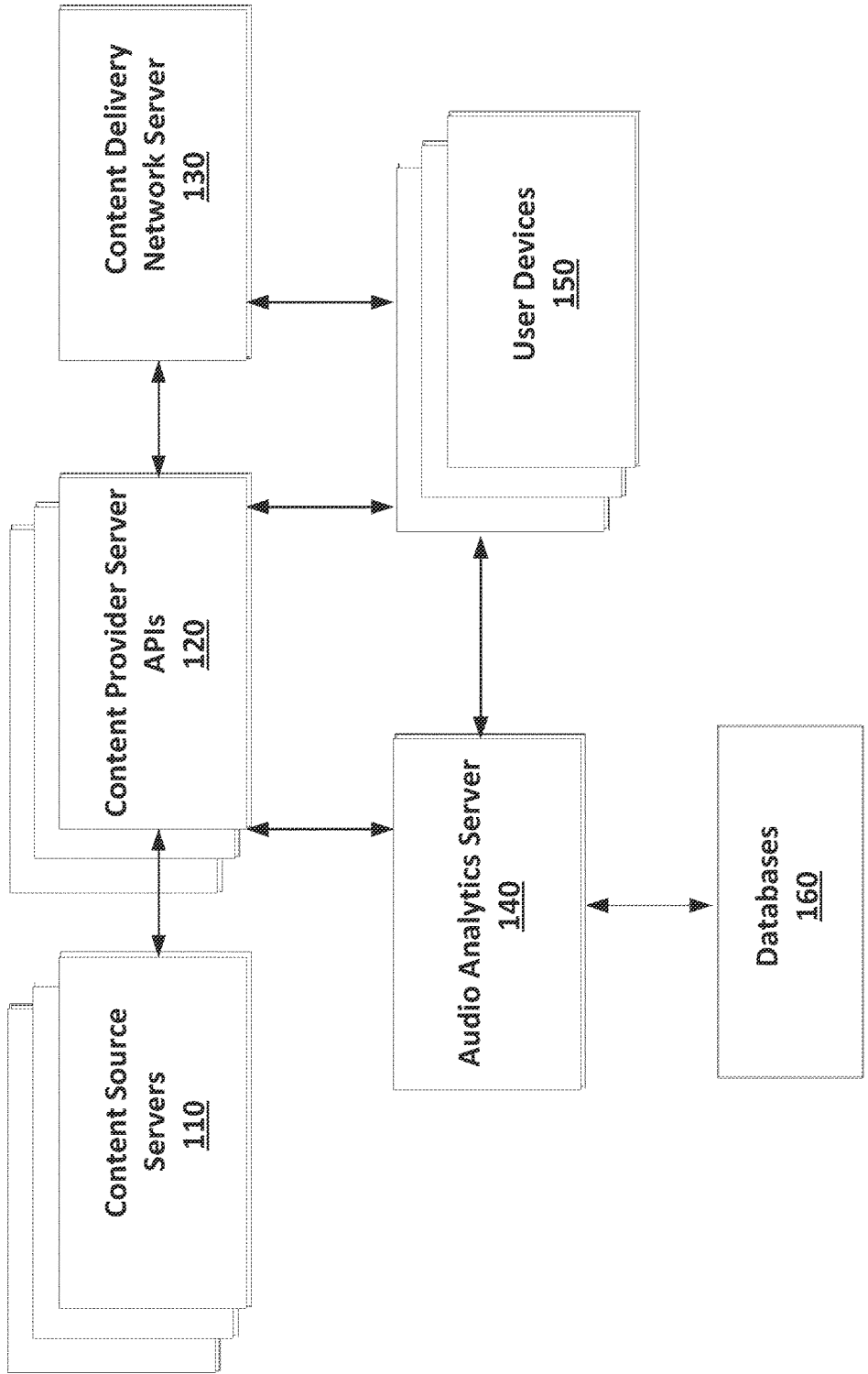
FIG. 1 illustrates a network environment in which a system for dynamic audio optimization associated with digital content may be implemented.

FIG. 1 illustrates a network environment 100 in which a system for dynamic audio optimization associated with digital content may be implemented. The network environment 100 may include one or more content source servers 110 that provide digital content (e.g., games, other applications and services) for distribution, one or more content provider server application program interfaces (APIs) 120, content delivery network server 130, audio analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, translation filter server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Audio analytics server 140 may include any data server known in the art that is capable of communicating with the different content source servers 110, content provider server APIs 120, content delivery network server 130, user devices 150, and databases 160. Such audio analytics server 140 may be implemented on one or more cloud servers that carry out instructions associated with interactive content (e.g., games, activities, video, podcasts, User Generated Content ("UGC"), publisher content, etc.). The audio analytics servers 140 may further carry out instructions, for example, for monitoring one or more incoming audio streams to one or more audio output devices in a real-world space (e.g., room), as well as real-world audio output within the real-world space. Specifically, the audio analytics server 140 may analyze the audio output against the incoming audio stream in view of one or more stored audio profiles. The audio analytics server 140 may calibrate (and continually recalibrate) the audio settings of the audio output devices in accordance with the analysis of the incoming and output audio. Different sets of audio settings may be stored in an audio profile, which may be specific to a space (e.g., Jens Living Room), to a digital content title (e.g., Fortnite), and/or to a set of conditions (e.g., late night after 12 AM, ambient or environmental sound levels).

The user device 150 may include a plurality of different types of computing devices known in the art. The user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams.

In some embodiments, user devices 150 may include a set of different types of user devices located in a real-world space (e.g., living room, family room, playroom, or other building space) associated with a particular user or set of users. User devices 150 may include, for example, any device (including smart device) capable of outputting and/or capturing audio or sound, as well as communicating with other user devices 150 in the communication network 100 and/or real-world space. As such, user devices 150 may include home theater devices, televisions, soundbars, device controllers, handheld devices, speakers and sub-woofers, headsets (including headphones, earphones, or other head- or ear-mounted speakers), other peripheral or accessory devices that may include associated audio output components, and microphones (which may be separate from or built into another user device). Some devices may include both microphones and audio output components (e.g., speakers). Thus, user devices 150 may also be inclusive of smart home devices, Internet of Things (IoT) devices, virtual assistant devices, baby and pet monitoring devices, etc.

In an exemplary embodiment, a subset of the user devices 150 distributed in a particular real-world space (e.g., playroom) may include audio output devices, each of which may be located in different locations within the real-world space and include different audio capabilities (e.g., mono versus stereo, 3D audio effects, noise cancellation, frequency ranges, volume ranges, treble/bass, etc.) and related settings. The real-world space may be configured in a variety of different ways that may exhibit different effects upon audio and sound waves that travel within and throughout the space. For example, the configuration of walls, height of ceiling, surface materials with different reflective, absorption or diffusive properties, presence of objects or individuals, etc., may affect the way the audio is experienced by a user within the real-world space. In addition, because the user devices 150 may include mobile, handheld, or otherwise portable devices, the specific set of audio output devices within the real-world space may not only change in terms of presence within the real-world space, but the relative locations within the real-world space may also change based on movement or relocation by the user. Further, the specific location of the user within the real-world space may also result in a slightly different audio experiences as well.

While pictured separately, the databases 160 may be stored on any of the servers and devices illustrated in network environment 100 on the same server, on different servers, or on any of the user devices 150. Such databases 160 may store or link to various sources and services used for audio analytics and modifications. In addition, databases 160 may store a variety of different audio profiles (e.g., associated with a particular real-world space, content title, or other condition of the current session) and information regarding available audio settings, as well as audio modifications and customizations that may be specific to a particular user, user group or team, user category, game title, game genre, sound types, conditions, etc. The audio profiles may be used to identify specific speaking voices (e.g., of the user, of specific other users), which may serve as an audio parameter that may be prioritized and subject to audio modifications. One or more audio profiles may also be stored in the databases 160 for each user, real-world space, content title, or condition.

A user-specific audio profile may further include a set of audio parameters specified or adopted by the user as preferred. For example, the user may prefer high volumes or high levels of bass. Such audio parameters—and the settings of the specific audio devices associated with the user and that would result in such audio parameters—may be stored in the audio profile and updated as preferences are determined to have changed. In another example, certain users may have different hearing-related conditions that make certain sounds or frequencies unpleasant or difficult to discern. An audio profile that is optimized for such a user may specify audio settings applicable to modify incoming audio streams so as to reduce the problematic sound or frequencies that are output from audio output devices associated with the user. Different hearing preferences (e.g., frequency response ranges, speed ranges, volume ranges) may also be specified by the user and stored in the audio profile, as well as related audio settings for specific audio output devices associated with the user and applicable to incoming audio streams to optimize in accordance with the user preference. The preferences and related audio settings may be applied to the combination of streams, individual streams, and/or specific sounds/speech within the streams, as well as to the combination of audio output devices or individual audio output devices.

One or more microphones may also be used to capture data regarding sound and audio within the real-world space where the user is located during the interactive session. In comparison to the digital audio stream, captured data regarding sound and audio may include or be indicative of ambient or environmental noise, echo, and other audio deviations or distortions. Audio analytics server 140 may therefore monitor and compare an incoming digital audio stream to real-world audio during a current session to identify and measure different types of audio deviations or distortions, as well as to determine which audio settings may compensate for or neutralize the identified audio deviations or distortions associated with the specific real-world space. The results of the analyses may be stored in an audio profile specifically associated with the real-world space and its characteristics and properties, including acoustic properties.

Different audio profiles may also be specified depending on the specific content title, content type (e.g., movie versus game versus virtual concert), peer groups (e.g., friends, teammates, competitors, spectators), channels or platforms (e.g., in-game chat, external chat services such as Discord), and other characteristics of the session. In a given session, one or more user devices 150 in the real-world space may receive the same or different audio streams. Audio analytics server 140 may serve as an intermediary device that modifies one or more of the audio settings before delivering the streams to the audio output device(s) for processing and play. Alternatively, audio analytics server 140 may operate in conjunction with one or more local applications to provide and apply audio-related insights and setting modifications to the user device(s) 150.

Real-world audio may not continually or consistently exhibit the same audio distortions or deviations over time. As such, the audio analytics server 140 may continually recalibrate an audio profile in view of changing conditions. The recalibrated audio profile may specify different audio settings associated with neutralizing or compensating for audio distortions or deviations detected in real-time (or near real-time) during a current session. In some homes or other real-world spaces, the types of audio distortions or deviations—or other constraints—may be recurring. For example, traffic noises may be particularly loud during rush hours, small children may have consistent bedtimes requiring low volumes or switch to headset audio devices, and homes close to airport flight paths may experience airplane-related noise. Such regular and irregular patterns may be identified by audio analytics server 140 based on comparisons and correlations to historical data regarding similar conditions and real-world sound and audio. Audio analytics sever 140 may monitor historical data regarding conditions and audio so as to detect new and emerging audio patterns that recur over time. Such insights may be used to update the audio profile regarding the real-world space as to what audio settings may be optimal to achieve certain results in view of the identified audio patterns.

In some embodiments, an audio profile may be specific to a digital content title. Such an audio profile may be defined by a predetermined set of acoustic properties that should result from an optimized audio system. For example, content in the horror genre may include extremely quiet scenes that build suspense, tension, or fear, as well as set up for a loud and dramatic climactic scene. Optimizing audio settings so as to enhance the horror experience may include different sets of audio settings to ensure quiet scenes have their intended effect and experience in view of the acoustic properties of the real-world environment, as well as to ensure that loud and dramatic scenes have their intended effect and experience. Alternatively, the audio settings may be optimized to minimize tension and fear from content in the horror genre for certain user groups (e.g., small children, people with heart conditions or other sensitivities). An audio profile that is optimized for a specific type of experience in relation to a content title (or scene within the content title) may be generated by the content developer, service provider, the user, or other users. Such audio profiles may be generated and shared among users who may share the desire for a specific type of audio experience. As such, an audio profile may not only be optimized for different audio output devices, systems, and content titles (e.g., type, genre, etc.), but an audio profile may further be optimized by real-world audio constraints, theme, mood, health/sensitivity/accessibility, and other preferences.

In some embodiments, audio analytics server 140 may generate an audio profile for a real-world space by transmitting a calibration signal (which may be the same or different for each device) to audio output devices in the real-world space. The calibration signal may include a predetermined multiplayer signal or set of signals that includes a plurality of different frequencies. The audio output devices may include not only traditional entertainment devices (e.g., television, console, soundbars, speakers, sub-woofers), but any audio output device connected to a communication network for receiving the signal, including devices with built-in speakers (e.g., controllers), mobile devices, headsets, smart home devices (including virtual assistant devices), IoT devices, etc. The audio output devices may play the calibration signal within the real-world space, whereupon the outputted signal (including frequency response) may be captured by microphones (which may or may not be associated with the audio output devices) in the real-world space.

Based on the captured frequency response data, the audio analytics server 140 may identify certain properties (including acoustic properties) regarding the real-world space. Such properties may include data regarding relative locations of the audio output devices and other acoustic data that may be used to assess and measure audio distortions and deviations relative to the digital calibration signal(s). Once the audio distortions and deviations are identified, audio analytics server 140 may further determine which audio settings for each of the audio output devices in the real-world space may compensate for or neutralize the audio distortions and deviations. Moreover, because the user may move within the real-world space, audio settings may be recalibrated to dynamically provide a consistent audio experience to the user even as the user may move around from location to location within the real-world space. To aid such determinations, other types of sensors may be used to track user location within the real-world space, including cameras, infrared, movement sensors, beacon devices, wearable devices, handheld devices, etc.

As discussed above, historical data regarding various conditions may be tracked relative to resulting audio experience. The audio analytics server 140 may further use historical data to determine which audio settings best compensate for or neutralize any degradation in audio within the real-world space, which may also include audio settings that are optimized for different types of audio experiences. Audio analytics server 140 may therefore also generate instructions for one or more adjustments to the audio settings for one or more of the audio output devices. Such instructions may be generated using one or more APIs from content provider server APIs 120 that may be associated with the specific audio output devices. When an audio profile is recalibrated with new audio settings or new audio setting modifications, new instructions may be generated based on the recalibrated audio profile. In some embodiments, the audio analytics server 140 may generate a notification to the user regarding the recalibrated audio profile and request approval to implement the new or modified audio settings in the recalibrated audio profile. Such notification may further include recommendations or suggestions regarding how to obtain a particular audio experience. Such recommendations may include checking whether certain audio output devices are plugged-in, turned on, switching between the home entertainment system to headset, or vice versa, as well as the specific audio settings determined to achieve an experience desired by the user, which may be stored in a user profile alongside express and implied preferences, historical interactive session data, interactive habits, etc. Upon approval from the user, the new or modified audio settings in the recalibrated audio profile may be provided to the respective audio output devices in the real-world space for use in processing incoming audio streams.

Figure 2:
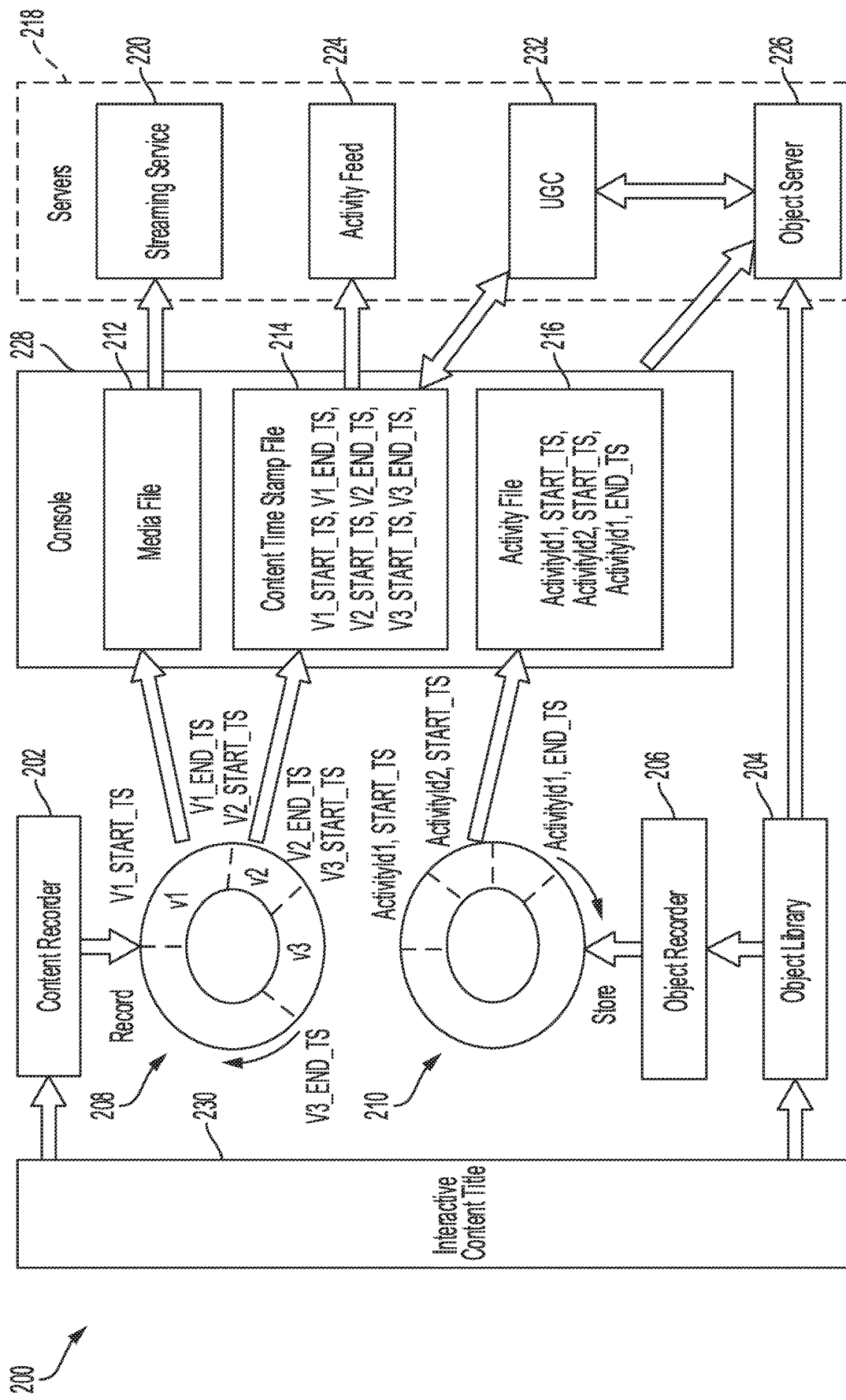
FIG. 2 illustrates an exemplary uniform data system (UDS) that may be used to provide data to a system for dynamic audio optimization associated with digital content.

FIG. 2 illustrates an exemplary uniform data system (UDS) 200 that may be used to provide data to a system for dynamic audio optimization associated with digital content. Based on data provided by UDS 200, translation filter server 140 can be made aware of the current session conditions, e.g., digital content title, what virtual (e.g., in-game) objects, entities, activities, and events that users have engaged with, and thus support analysis of and coordination of audio optimization by audio analytics server 140 with current virtual interactive and/or in-game activities. Each user interaction within a virtual environment may be associated the metadata for the type of virtual interaction, location within the virtual environment, and point in time within a virtual world timeline, as well as other players, objects, entities, etc., involved. Thus, metadata can be tracked for any of the variety of user interactions that can occur in during a current interactive session, including associated virtual activities, entities, settings, outcomes, actions, effects, locations, and character stats. Such data may further be aggregated, applied to data models, and subject to analytics. Such a UDS data model may be used to assign contextual information to each portion of information in a unified way across digital content and/or game titles.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 150) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 150. In another example, an object file 216 and a content time stamp file 214 may be associated by the console 228 during creation of each file 216, 214.

In exemplary embodiments, the media files 212 and activity files 216 may provide information to audio analytics server 140 regarding current session conditions, which may also be used as another basis for evaluating incoming audio streams and for applying audio modifications thereto. Audio analytics server 140 may therefore use such media files 212 and activity files 216 to identify specific conditions of the current session, including currently speaking or noise-producing players, characters, and objects at specific locations and events. Based on such files 212 and 216, for example, audio analytics server 140 may identify a relevant audio profile associated with the content title, virtual environment, virtual scene or in-game event (e.g., significant battles, proximity to breaking records), which may be used to dynamically modify audio settings during and throughout the current session. Such session conditions may drive how the audio settings for different audio output devices may be modified, thereby resulting in customized determinations as to whether and which audio setting modifications are applied and to what extent.

Figure 3:
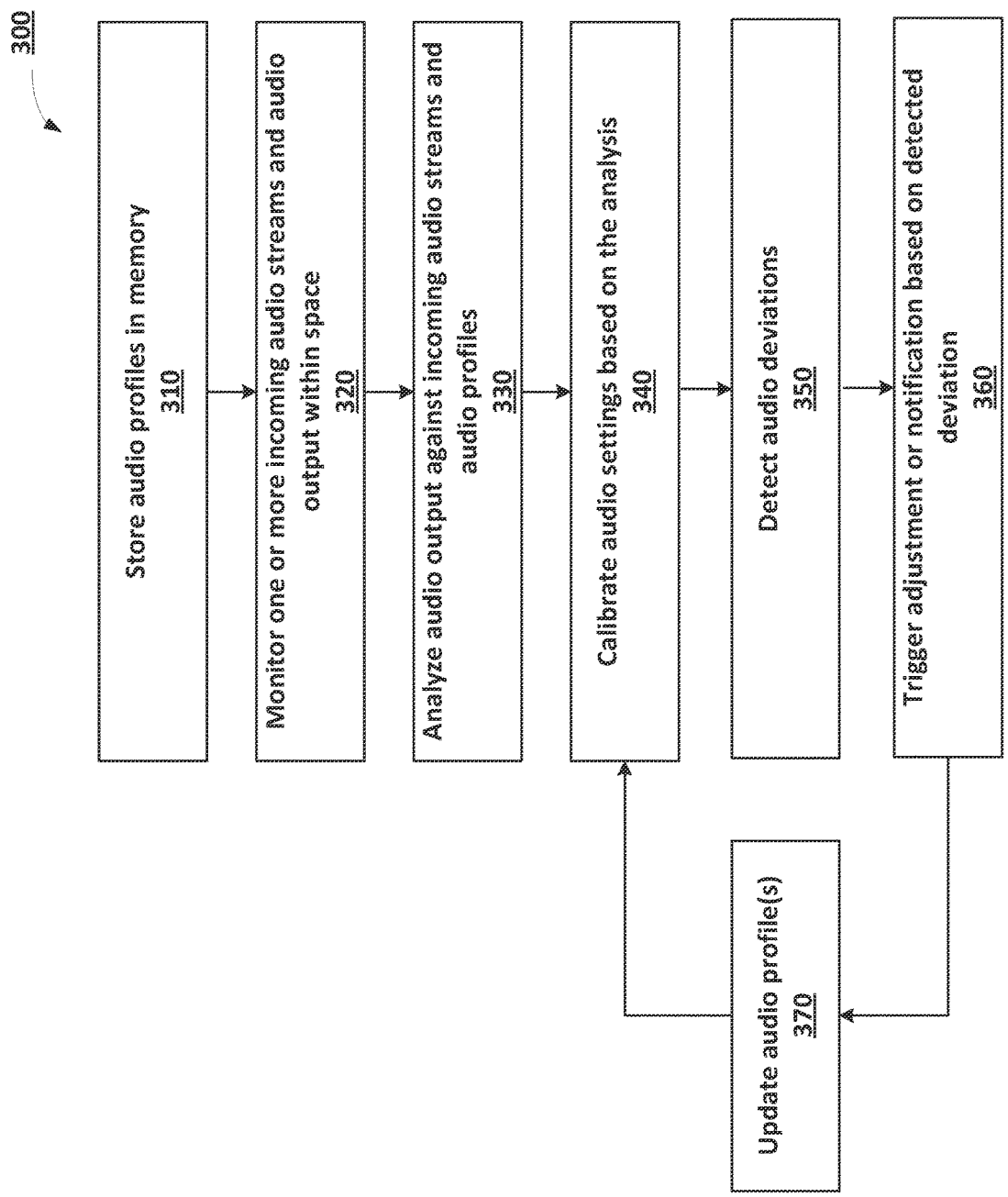
FIG. 3 is a flowchart illustrating an exemplary method for dynamic audio optimization associated with digital content.

FIG. 3 is a flowchart illustrating an exemplary method 300 for dynamic audio optimization associated with digital content. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, audio profiles may be stored in memory (e.g., databases 160). Each audio profile may include a set of audio settings for one or more audio output devices. As discussed above, the audio profile may be specific to a real-world space (e.g., room where a user conducts interactive sessions), specific to content titles (or genres), as well as other audio conditions. In some embodiments, a new user may develop or further customize an audio profile by specifying their personal preferences and priorities in relation to different sounds and audio streams across different audio output devices and content titles. In some implementations, audio analytics server 140 may query the new user in order to identify how to generate the audio profile for the user and/or real-world space associated with the user's interactive sessions. Users may also opt to customize existing audio profiles based on their own personal preferences (which may be related to specific audio setups, content titles, or genres thereof), which may be shared with other users for use in implementing dynamic audio optimization.

In step 320, one or more incoming (digital) audio streams may be monitored by audio analytics server 140, which may also—via microphones and audio detection devices— monitor the real-world audio output within the real-world space. A user using user devices 150 to stream and play digital content and related audio in a current session may be presented with an audio stream associated with the digital content. Where the digital content is a multiplayer game, another audio stream associated with voice chat functions may also include sounds and speech associated with other users. In some cases, other chat services (e.g., Discord server) may be used to provide yet another audio stream. In some embodiments, the incoming audio stream may include calibration signals, the frequency response of which may be captured as played within the real-world space. Calibration and recalibration may occur periodically or may be triggered by conditions that are detected as having changed during an interactive session. For example, the battery of an audio output device may be depleted, a plug of an audio device may fall or be knocked out of an outlet, or the speaker(s) of the audio output device may otherwise go offline for any reason. Different virtual interactive scenes may entail different types of audio settings to optimize for a particular experience, mood, or effect.

In step 330, the audio streams and real-world audio output are analyzed by audio analytics server 140 against an applicable audio profile. In particular, target audio parameters or device-specific audio settings specified by the audio profile are identified as diverging from the real-world audio being monitored in the real-world space. Such divergence may result from audio distortions or deviations arising from the configuration and properties of the real-world space. In addition, certain audio parameters, requirements, or constraints may be discerned by reference to historical data, which may be aggregated and analyzed to identify indicated patterns of user behavior in relation to audio. For example, the user may repeatedly lower system audio volume after a certain times of night, switch between speakers to headsets, or otherwise change audio settings in response to certain content titles or genres thereof. Thus, a variety of audio-related factors may indicate audio distortions or deviations existing in the real-world space.

In step 340, one or more audio settings associated with at least one of the audio devices in the real-world space may be calibrated based on the analysis performed in step 330. More specifically, the audio settings may be adjusted in a way as to compensate for or neutralize the identified audio distortions or deviations. For example, where certain sounds from a particular audio output device may be determined to be absorbed or reflected by surfaces by a certain extent, audio analytics server 140 may adjust the audio settings for that particular audio output device and/or others in order to compensate for or neutralize such absorption or reflection. Based on the analysis performed n step 330, therefore, audio analytics server 140 may make one or more audio setting modification(s) for one or more audio devices. In some implementations, calibration and recalibration may continually occur, resulting in automated adjustments to audio settings in order to fine-tune a user's audio experience within the real-world space. In some embodiments, user feedback as to preferences, likes and dislikes about a current audio experience, etc., may be used to make predictions as to what the user is likely to prefer in relation to new content titles, changes to the real-world space, or other situations for which current audio profiles may not be fully applicable. New audio profiles may be created, or old audio profiles may be further refined to account for new and different combinations of conditions.

In step 350, the incoming audio stream(s) may have been provided to one or more audio output devices for play and presentation in real-time or close to real-time in accordance with the audio settings calibrated in step 340, but audio deviations may be detected. The user of user device 150 may therefore be presented with audio stream(s) that have been processed in order to create an audio experience consistent with the applicable audio profile, but current conditions may change the way the audio is presented or experienced. For example, sudden increases in background noise (e.g., from kids, neighbors, birds, construction, or other sources) may prevent the user from discerning certain sounds associated with the virtual environment and provided in the incoming audio stream. While the user may want to pause a current session in response to certain external noise sources (e.g., kids), the user may otherwise wish to block out or otherwise neutralize the other sources of background noise. As such, the audio deviation or distortion may not only be detected and measured, but also be further analyzed to characterize a type of audio deviation or distortion so as to trigger different types of adjustments or responses. In addition, the user may also continue to specify refinements and other changes to the audio profile over time, which allows for audio modifications to be applied to future audio streams in a manner that better reflects the user's preferences and priorities.

In step 360, an adjustment or notification may be triggered based on the audio deviation detected in step 350. As discussed herein, the adjustment may include an adjustment to one or more audio settings of one or more audio output devices in the real-world space. In some embodiments, additional recommendations or suggestions for acoustic improvement may be sent to the user via notification. For example, one or more audio devices may be detected as being offline, and the notification may advise the user to check the status of the offline devices and to bring the offline devices back online. Some implementations may request approval from the user before implementing certain adjustments. For example, the user may not currently be wearing a headset with spatial audio capabilities, and the audio of an upcoming scene may include spatial audio effects. The notification may suggest that the user put on the headset ahead of the upcoming scene in order to experience the spatial audio effects.

In step 370, one or more audio profiles may be updated in accordance with the detected audio deviation and associated adjustment or notification. Such updates may include information regarding the detected audio deviation and how well the adjustment neutralized or compensated for the same, as well as how well the user seemed to respond to the dynamic audio optimization actions. Such data may be used to continually fine-tune the audio profile to provide an audio experience that aligns to user expectations and preferences.

Figure 4:
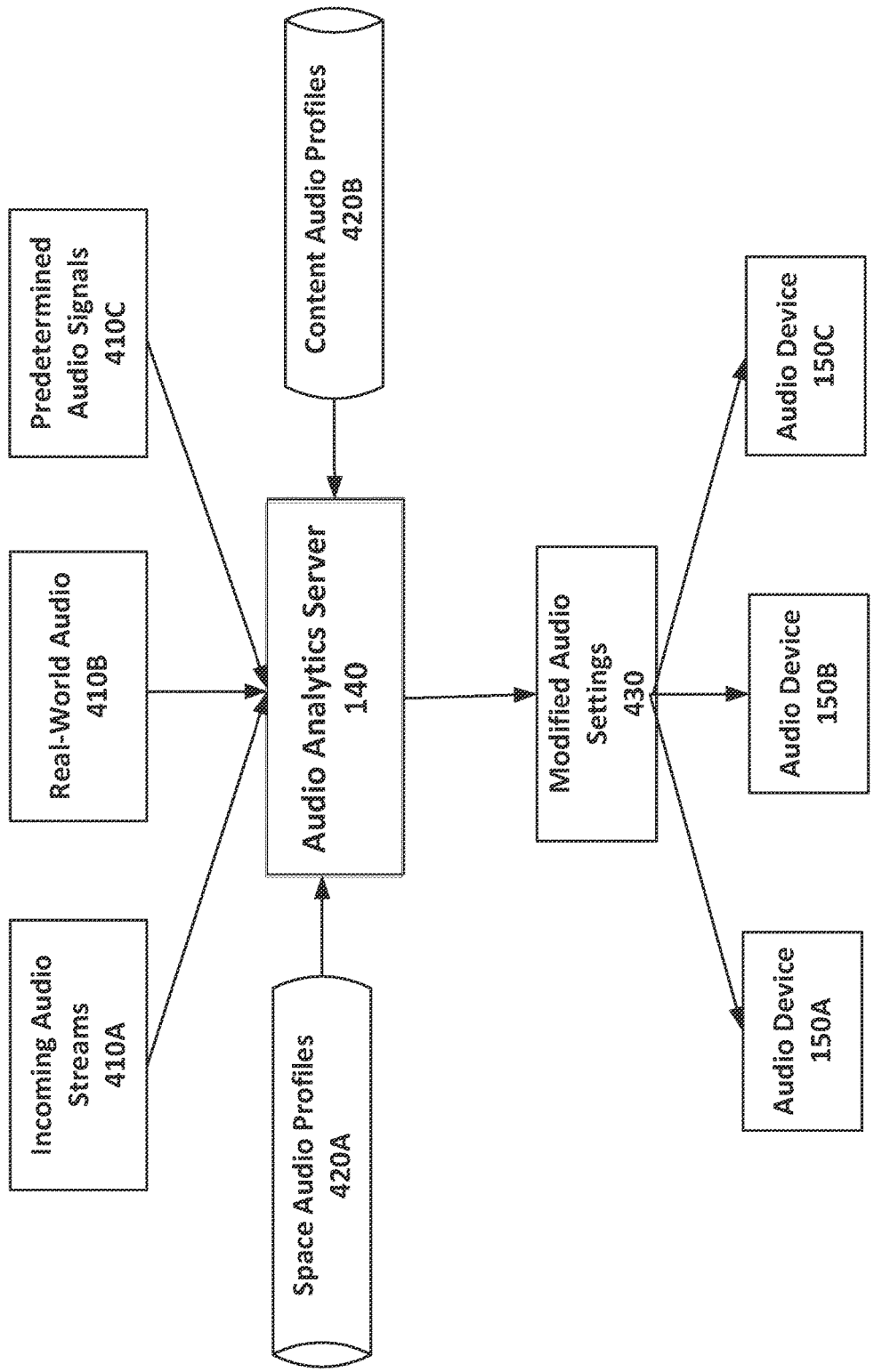
FIG. 4 is a diagram illustrating an exemplary implementation of dynamic audio optimization associated with digital content.

FIG. 4 is a diagram illustrating an exemplary implementation of dynamic audio optimization associated with digital content. As illustrated, different audio sources 410A-C may be monitored during a current session of user device and provided to audio analytics server 140 for analysis and processing. Incoming audio stream 410A may be a digital audio stream associated with an interactive content title as provided from a content source server (e.g., content source server 110 of FIG. 1) and include audio associated with play of that interactive content title. Incoming audio stream 410A may be provided not only to audio output devices, but may also be provided or monitored by audio analytics server 140. Real-world audio 410B may include digital audio stream associated with a content title as processed and played by real-world audio output devices, as well as background noise in the real-world space. Real-world audio 410C may be captured by one or more microphones of user device 150 located in the real-world space and provided to audio analytics server 140 for analysis and processing. Predetermined audio signals 410C may also be provided to the audio analytics server 140, as well as to the audio output devices in the real-world space for play, for use in calibration (and recalibration).

Audio analytics server 140 may obtain one or more audio profiles from one of the databases 160, which may include a specific database that stores space-specific audio profiles 420A (which may be shared by a group of users in the same household) and/or content-specific audio profiles 420B (which may be shared by groups of users playing the same interactive content title). Using the audio profile associated with the user of user device 150, audio analytics server 140 may analyze various audio parameters of the sound and audio within the real-world space. The different audio parameters may be identified and characterized by audio analytics server 140 as being associated with the incoming audio stream 410A, predetermined audio signals 410C, or audio deviations or distortions present in the real-world space. The audio analytics server 140 may further identify what audio setting modifications are specified by the audio profile for compensating for or neutralizing any detected deviation or distortion, and/or predict what audio setting modifications may best compensate for or neutralize detected deviation or distortion. The identified or predicted audio setting modifications may then be transmitted by audio analytics server 140 to one or more audio output devices 150, which may then process their respective incoming audio streams 410A or portions thereof in accordance with the respective modified audio settings.

Figure 5:
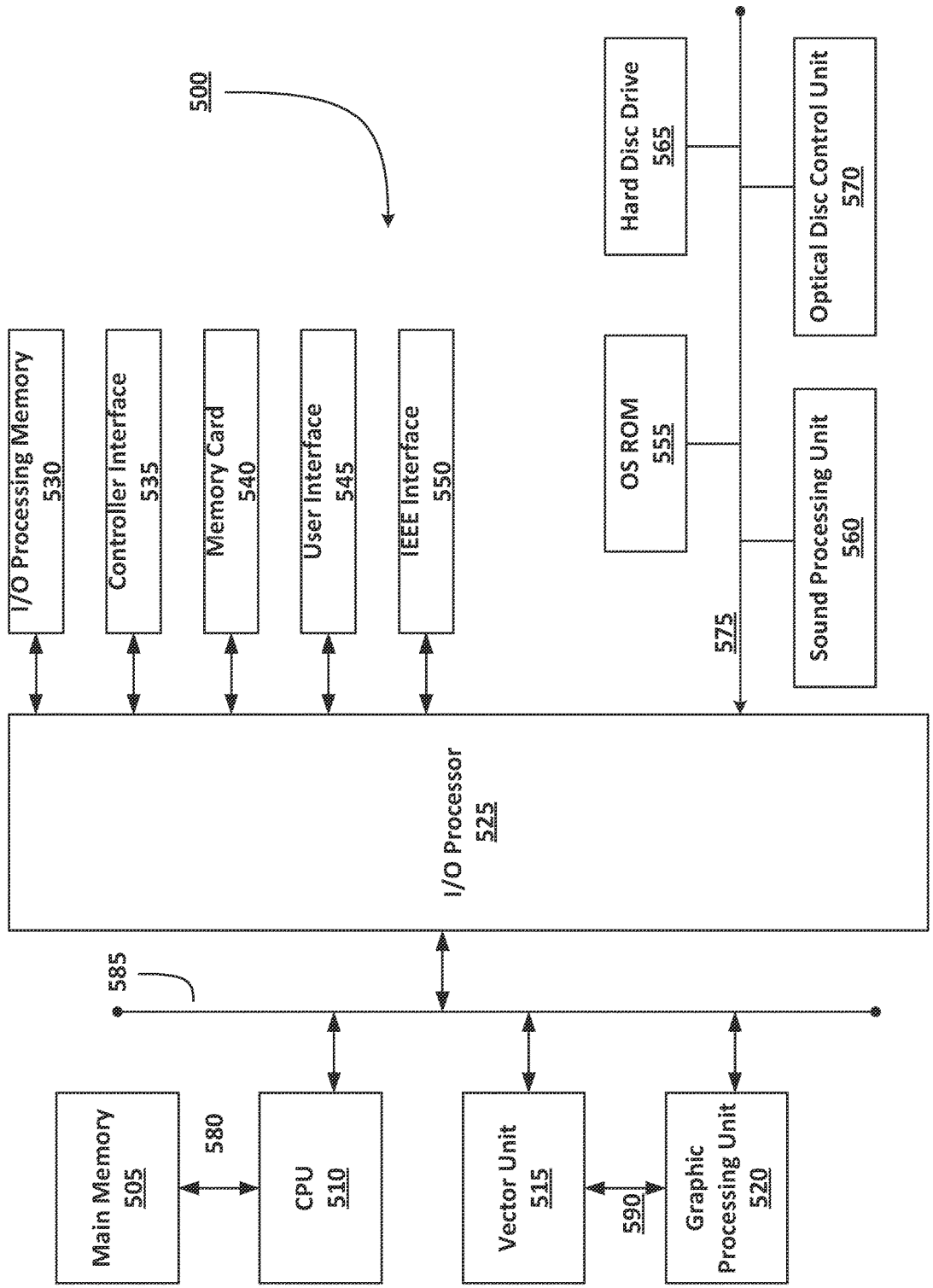
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for dynamic audio optimization associated with digital content, the method comprising:
    storing one or more audio profiles in memory, wherein each of the audio profiles includes one or more audio settings for one or more audio output devices available to a user;
    monitoring an incoming audio stream associated with a current interactive session of the user and real-world audio within an identified real-world space where the user is located;
    detecting one or more audio deviations based on a comparison of the incoming audio stream and the real-world audio within the identified real-world space;
    automatically recalibrating an audio profile associated with the current interactive session, wherein at least one of the audio settings of the audio profile is modified;
    generating instructions for adjusting the audio settings to neutralize one or more of the audio deviations associated with one or more properties of the real-world space as identified by current frequency response data captured in the real-world space relative to frequency response data associated with a calibration signal previously played in the real-world space; and
    modifying the at least one audio setting of the audio output devices within the identified real-world space based on the recalibrated audio profile and the generated instructions, wherein the audio output devices process audio of the incoming audio stream in accordance with the at least one modified audio setting.

2. The method of claim 1, wherein the audio profile is specific to a digital content title associated with the incoming audio stream, and wherein the audio settings in the audio profile are based on a predetermined set of acoustic properties associated with the digital content title.

3. The method of claim 1, wherein the audio profile is specific to the identified real-world space and includes one or more acoustic properties of the identified real-world space, and wherein the audio settings in the audio profile are based on the acoustic properties of the identified real-world space.

4. The method of claim 3, further comprising generating the audio profile, wherein generating the audio profile includes:
    providing the calibration signal to one or more of the audio output devices to play in the real-world space, wherein the calibration signal is associated with one or more predetermined frequencies;
    receiving the frequency response data captured by one or more microphones in the real-world space when the calibration signal is played by the one or more audio output devices; and
    identifying the one or more properties of the real-world space based on the frequency response data, wherein the identified properties include the acoustic properties.

5. The method of claim 4, wherein identifying the properties of the real-world space includes identifying relative locations of the audio output devices within the real-world space.

6. The method of claim 4, wherein the calibration signal is a predetermined multilayer signal that includes a plurality of different frequencies.

7. The method of claim 4, wherein the audio output devices in the real-world space includes one or more of a television, game console device, console controller, speaker, sub-woofer, computing device, mobile device, handheld electronic device, smart device, Internet of Things (IoT) device, and head-mounted speaker device.

8. The method of claim 1, wherein automatically recalibrating the audio profile includes monitoring one or more conditions of the real-world space, and wherein the at least one audio setting of the audio profile is modified based on the monitored conditions.

9. The method of claim 1, wherein automatically recalibrating the audio profile is further based on historical data regarding the user or the real-world space, and wherein the at least one audio setting of the audio profile is modified based on one or more patterns identified in the historical data.

10. The method of claim 1, further comprising generating a notification to the user regarding the recalibrated audio profile, wherein modifying the at least one audio setting of the audio output devices within the identified real-world space is further based on an approval from the user in response to the notification.

11. A system for dynamic audio optimization associated with digital content, the system comprising:
    memory that stores one or more audio profiles, wherein each of the audio profiles includes one or more audio settings for one or more audio output devices available to a user;
    a communication interface that communicates over a communication network, wherein the communication interface receives an incoming audio stream associated with a current interactive session of the user;
    one or more microphones that detect real-world audio within an identified real-world space where the user is located; and
    a processor that executes instructions stored in memory, wherein the processor executes the instructions to:

detect one or more audio deviations based on a comparison of the incoming audio stream and the real-world audio within the identified real-world space;

automatically recalibrate an audio profile associated with the current interactive session, wherein at least one of the audio settings of the audio profile is modified;

generate instructions for adjusting the audio settings to neutralize one or more of the audio deviations associated with one or more properties of the real-world space as identified by current frequency response data captured in the real-world space relative to frequency response data associated with a calibration signal previously played in the real-world space; and modify the at least one audio setting of the audio output devices within the identified real-world space based on the recalibrated audio profile and the generated instructions, wherein the audio output devices process audio of the incoming audio stream in accordance with the at least one modified audio setting.

12. The system of claim 11, wherein the audio profile is specific to a digital content title associated with the incoming audio stream, and wherein the audio settings in the audio profile are based on a predetermined set of acoustic properties associated with the digital content title.

13. The system of claim 11, wherein the audio profile is specific to the identified real-world space and includes one or more acoustic properties of the identified real-world space, and wherein the audio settings in the audio profile are based on the acoustic properties of the identified real-world space.

14. The system of claim 13, wherein the processor executes further instructions to generate the audio profile, wherein generating the audio profile includes:

providing the calibration signal to one or more of the audio output devices to play in the real-world space, wherein the calibration signal is associated with one or more predetermined frequencies;

receiving the frequency response data captured by one or more microphones in the real-world space when the calibration signal is played by the one or more audio output devices; and identifying the one or more properties of the real-world space based on the frequency response data, wherein the identified properties include the acoustic properties.

15. The system of claim 14, wherein the processor identifies the properties of the real-world space by identifying relative locations of the audio output devices within the real-world space.

16. The system of claim 14, wherein the calibration signal is a predetermined multilayer signal that includes a plurality of different frequencies.

17. The system of claim 14, wherein the audio output devices in the real-world space includes one or more of a television, game console device, console controller, speaker, sub-woofer, computing device, mobile device, handheld electronic device, smart device, Internet of Things (IoT) device, and head-mounted speaker device.

18. The system of claim 11, wherein the processor automatically recalibrates the audio profile by monitoring one or more conditions of the real-world space, and modifying the at least one audio setting of the audio profile based on the monitored conditions.

19. The system of claim 11, wherein the processor automatically recalibrates the audio profile further based on historical data regarding the user or the real-world space, and modifying the at least one audio setting of the audio profile based on one or more patterns identified in the historical data.

20. The system of claim 11, wherein the processor executes further instructions to generate a notification to the user regarding the recalibrated audio profile, wherein modifying the at least one audio setting of the audio output devices within the identified real-world space is further based on an approval from the user in response to the notification.

21. A non-transitory, computer-readable storage medium, having embodied thereon a program executable by a processor to perform a method for dynamic audio optimization associated with digital content, the method comprising:

storing one or more audio profiles in memory, wherein each of the audio profiles includes one or more audio settings for one or more audio output devices available to a user;

monitoring an incoming audio stream associated with a current interactive session of the user and real-world audio within an identified real-world space where the user is located;

detecting one or more audio deviations based on a comparison of the incoming audio stream and the real-world audio within the identified real-world space;

automatically recalibrating an audio profile associated with the current interactive session, wherein at least one of the audio settings of the audio profile is modified;

generating instructions for adjusting the audio settings to neutralize one or more of the audio deviations associated with one or more properties of the real-world space as identified by current frequency response data captured in the real-world space relative to frequency response data associated with a calibration signal previously played in the real-world space; and modifying the at least one audio setting of the audio output devices within the identified real-world space based on the recalibrated audio profile and the generated instructions, wherein the audio output devices process audio of the incoming audio stream in accordance with the at least one modified audio setting.

* * * * *